US007551582B2

(12) United States Patent
Mansour (10) Patent No.: US 7,551,582 B2
(45) Date of Patent: Jun. 23, 2009

(54) SYSTEM AND METHOD FOR OPTIMIZING WALSH CODE ASSIGNMENTS

(75) Inventor: Nagi Mansour, Arlington, VA (US)

(73) Assignee: Nextel Communications Inc., Reston, VA (US)

( * ) Notice: Subject to any disclaimer, the term of this patent is extended or adjusted under 35 U.S.C. 154(b) by 718 days.

(21) Appl. No.: 10/965,429

(22) Filed: Oct. 12, 2004

(65) Prior Publication Data

US 2008/0069066 A1    Mar. 20, 2008

(51) Int. Cl.
*H04W 4/00* (2006.01)
(52) U.S. Cl. .................. 370/329; 370/209; 370/320; 370/335; 370/350; 370/341
(58) Field of Classification Search ............... 370/209, 370/342, 329, 320, 350, 335, 341
See application file for complete search history.

(56) References Cited

U.S. PATENT DOCUMENTS

| 5,568,483 | A | * | 10/1996 | Padovani et al. ............ 370/468 |
| 5,596,570 | A | | 1/1997 | Soliman |
| 5,699,380 | A | | 12/1997 | Sugita |
| 5,933,424 | A | * | 8/1999 | Muto ......................... 370/342 |
| 6,298,051 | B1 | * | 10/2001 | Odenwalder et al. ........ 370/342 |
| 6,377,539 | B1 | * | 4/2002 | Kang et al. .................. 370/209 |
| 6,377,809 | B1 | * | 4/2002 | Rezaiifar et al. ............ 455/455 |
| 6,473,619 | B1 | * | 10/2002 | Kong et al. ............... 455/456.1 |
| 6,671,250 | B1 | | 12/2003 | Schiff |
| 6,731,674 | B1 | | 5/2004 | Yang et al. |
| 6,961,304 | B1 | * | 11/2005 | Rudrapatna et al. ......... 370/209 |
| 7,002,901 | B2 | * | 2/2006 | Yun et al. .................... 370/209 |
| 7,020,219 | B2 | * | 3/2006 | Panasik et al. .............. 375/324 |
| 7,313,398 | B1 | * | 12/2007 | Ramahi ...................... 455/436 |
| 7,333,469 | B2 | * | 2/2008 | Schiff ......................... 370/350 |
| 2002/0039907 | A1 | | 4/2002 | McKenna et al. |
| 2002/0067692 | A1 | | 6/2002 | Yun et al. |
| 2003/0067899 | A9 | | 4/2003 | Chen et al. |
| 2005/0271005 | A1 | * | 12/2005 | Rajkotia ..................... 370/329 |

OTHER PUBLICATIONS

International Preliminary Report on Patentability and Written Opinion of the International Searching Authority for PCT/US2005/036589 dated Apr. 17, 2007 and Oct. 23, 2006, respectively.
International Search Report of PCT/US05/36589 dated Oct. 23, 2006.
Written Opinion of the International Searching Authority of PCT/US05/36589 dated Oct. 23, 2006.

* cited by examiner

*Primary Examiner*—Ricky Ngo
*Assistant Examiner*—Dewanda Samuel (57) ABSTRACT

A wireless communication system is disclosed, including a network and a plurality of base stations coupled to the network, wherein each of the base stations are adapted to transmit only a Pilot channel information, one or more Paging channel information, and a Sync channel information using a first group of adjacent Walsh codes $W_i^n$ to $W_{i+j}^n$, where i and j are integers, and n is the length of the Walsh codes. In the wireless communication system, the base station may be further adapted to transmit traffic channel information using a second group of adjacent Walsh codes $W_{i+j+1}^n$ to $W_{n-1}^n$. Alternatively, the base station may be further adapted to transmit traffic channel information using a second group of adjacent Walsh codes $W_0^n$ to $W_{i-1}^n$. Alternatively, the base station may be further adapted to transmit traffic channel information using a second group of adjacent Walsh codes $W_{int(j/2+1)}^{n/2}$ to $W_{n/2-1}^{n/2}$ or $W_0^{n/2}$ to $W_{int(i/2-1)}^{n/2}$.

29 Claims, 6 Drawing Sheets

SYSTEM AND METHOD FOR OPTIMIZING WALSH CODE ASSIGNMENTS

FIELD OF THE INVENTION

This invention relates generally to wireless communication systems, and in particular, to a wireless communication system that optimizes Walsh code assignments such that the Pilot, Paging, and Sync channels use adjacent Walsh codes in a code division multiple access (CDMA) air interface.

BACKGROUND OF THE INVENTION

Wireless communication systems have been extremely popular for more than a decade. They allow users to communicate with each other while remaining geographically mobile. In addition, these systems allow communications to be in different modes, such as full-duplex voice, half-duplex voice, and data, as examples. An example of a wireless communication system protocol is 1xEV-DV which specifies requirements for a system optimized for data and voice communications. Although an 1xEV-DV wireless communication system serves to exemplify the invention, it shall be understood that the invention is applicable to other types of wireless communication systems.

Figure 1:
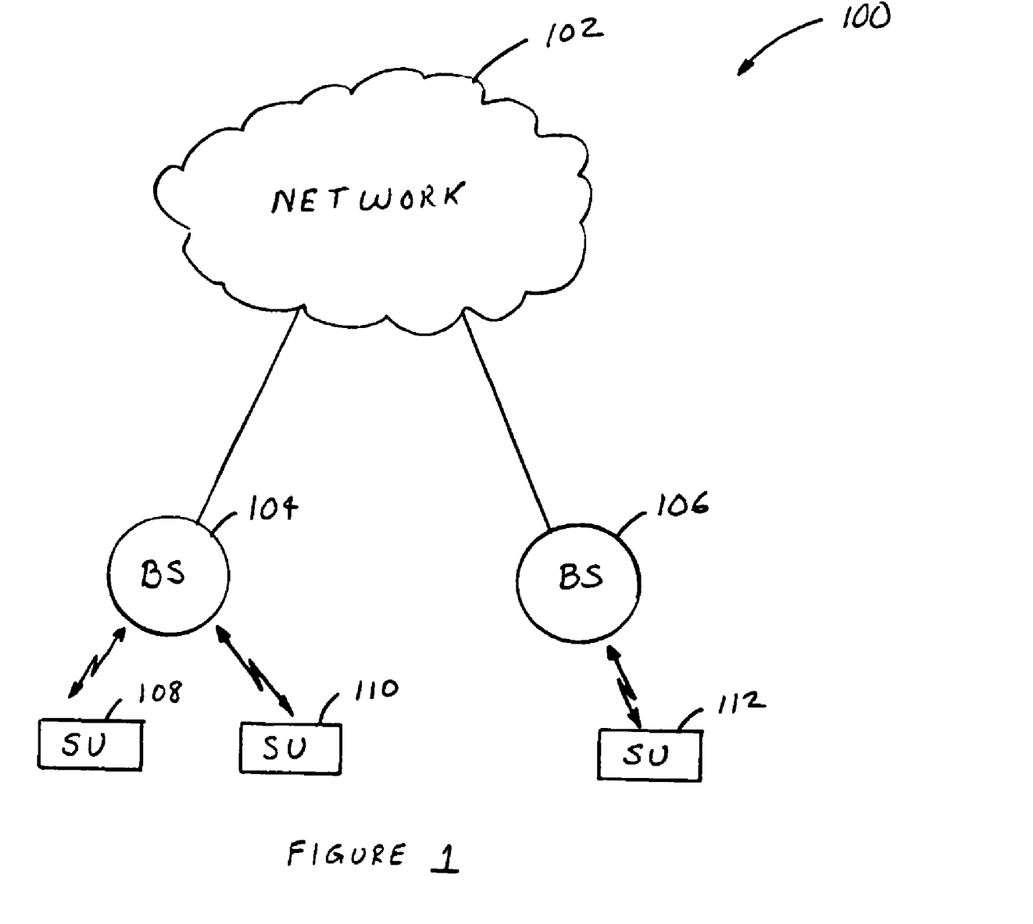
FIG. 1 illustrates a block diagram of an exemplary wireless communication system in accordance with an aspect of the invention.

FIG. 1 illustrates a block diagram of an exemplary wireless communication system 100. The wireless communication system 100 comprises a network 102, and a plurality of base stations 104 and 106 communicatively coupled to the network 102. The wireless communication system 100 serves a plurality of subscriber units (SUs), two of which are shown as SUs 108 and 110 currently communicating with base station 104, and one of which is shown as SU 112 currently communicating with base station 106. The network 102 includes a plurality of network devices that provide data communication services to the SUs. The base stations 104 and 106 provide an air interface between the network 102 and the SUs.

In the case of wireless communication system 100 operating in compliance with the 1xEV-DV protocol, the base stations 104 and 106 communicate with the SUs 108, 110, and 112 using a code division multiple access (CDMA) air interface. In CDMA, Walsh codes are used to define channels through which communications are sent from base stations to SUs. In the 1xEV-DV protocol, there are 28 Walsh codes of length 32. In addition, the 1xEV-DV protocol is backward compatible with the IS-95 protocol, which has 55 Walsh codes of length 64 reserved for traffic channels in the forward link used by base stations to communicate with SUs.

Figure 2:
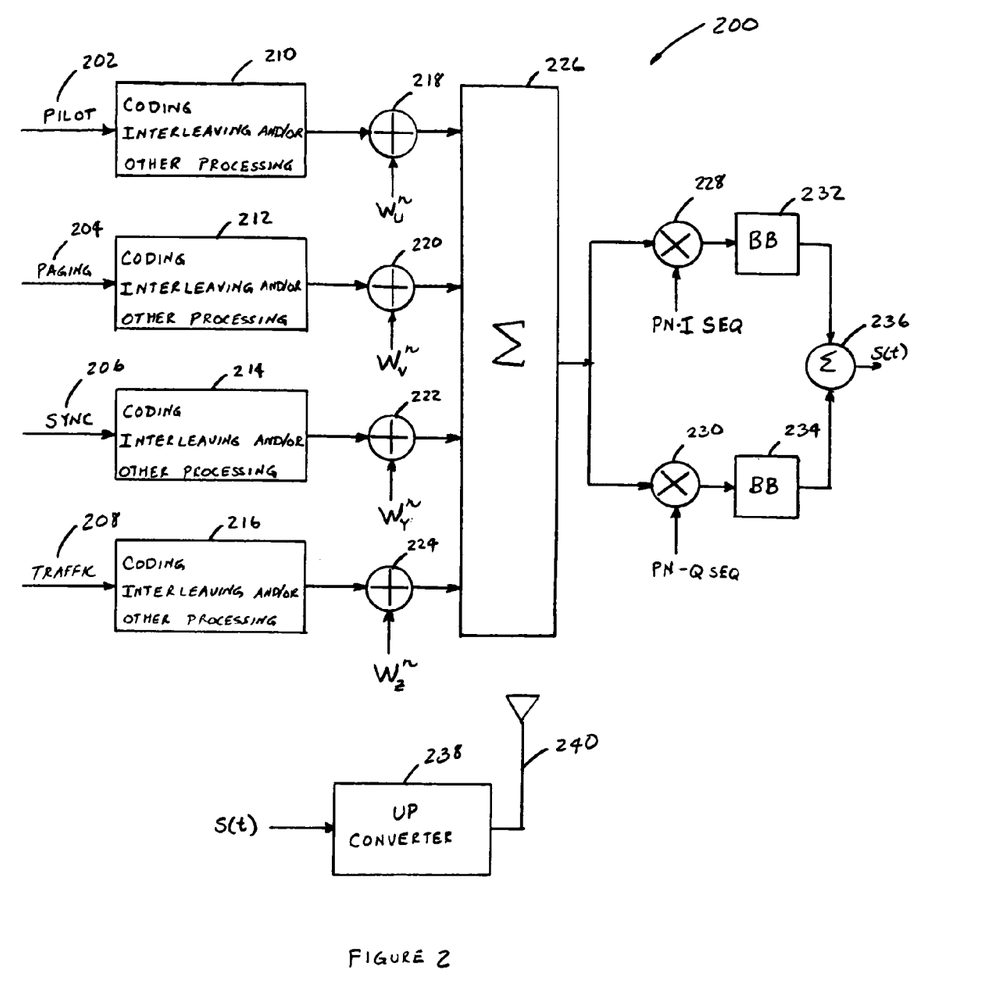
FIG. 2 illustrates a block diagram of an exemplary base station in accordance with an aspect of the invention.

FIG. 2 illustrates a block diagram of an exemplary base station 200. The base station 200 comprises a source 202 for the Pilot channel, a source 204 for the Paging channels, a source 206 for the Sync channel, and a source 208 for the traffic channels. The base station 200 further comprises a plurality of digital processing sections (e.g., coding, interleaving, etc.) 210, 212, 214, and 216 for processing the Pilot, Paging, Sync, and Traffic information, respectively. The base station 200 further comprises a plurality of modulo-2 adders 218, 220, 222, and 224 including inputs respectively coupled to the outputs of digital processing sections 210, 212, 214, and 216, and other inputs to respectively receive Walsh codes $W_U{}^n$, $W_V{}^n$, $W_Y{}^n$, and $W_Z{}^n$. The base station 200 further comprises a summer 226 including inputs respectively coupled to the outputs of the modulo-2 adders 218, 220, 222, and 224.

The base station 200 further comprises an I- and Q-modulator including a pair of I- and Q-mixers 228 and 230 having respective inputs coupled to the output of the summer 226, and other inputs to respectively receive pseudo-random (PN) I- and Q-sequences, baseband processing units 232 and 234 including inputs respectively coupled to the outputs of the mixers 228 and 230, and a second summer 236 having inputs respectively coupled to the outputs of the baseband processing units 232 and 234. Additionally, the base station 200 further comprises an up-converter 238 coupled to the output of the second summer 236. The base station 200 further includes an antenna 240 coupled to the output of the up-converter 238.

Figure 3:
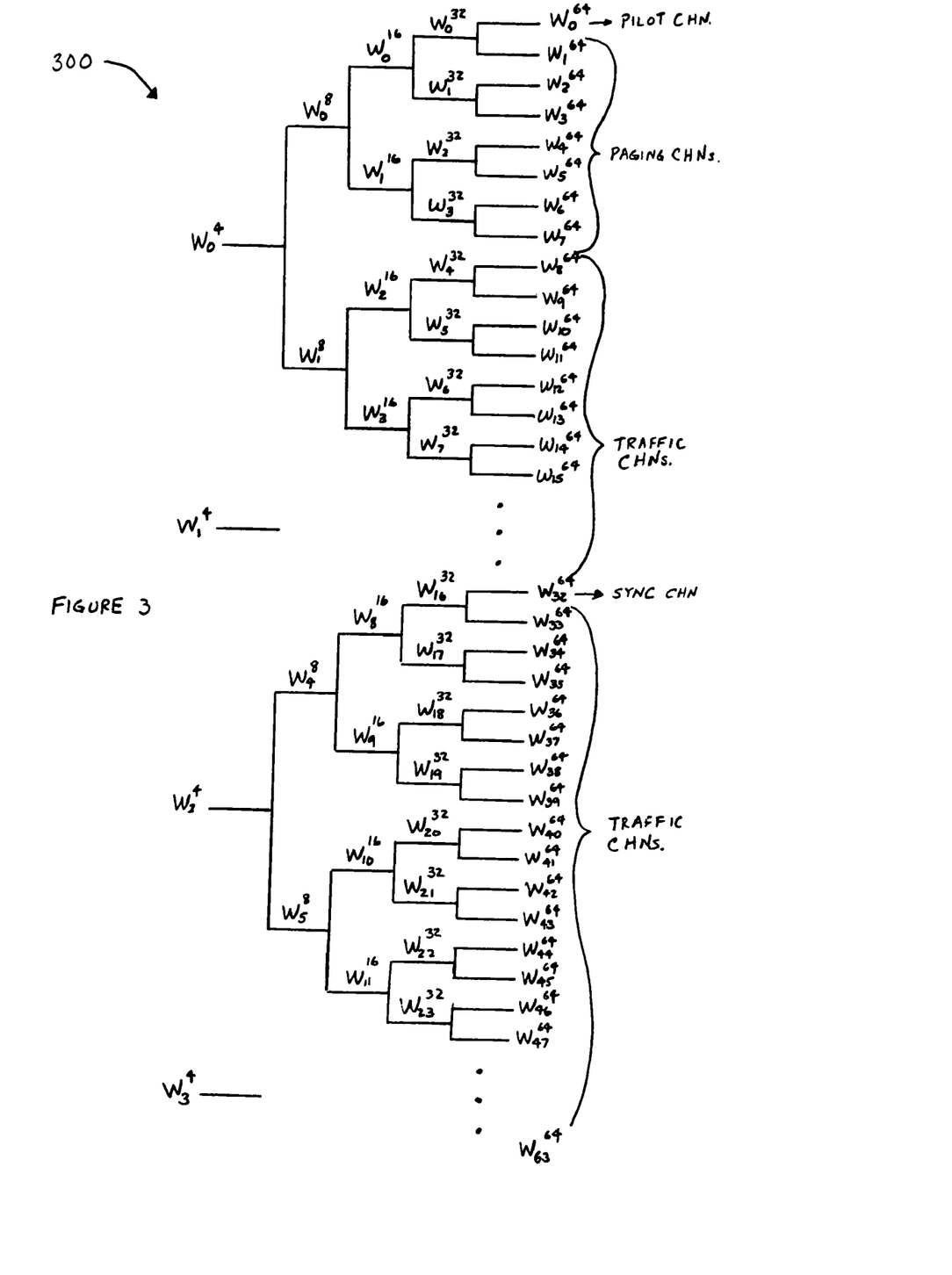
FIG. 3 illustrates a diagram of a Walsh code tree in accordance with the IS-95 protocol.

FIG. 3 illustrates a diagram of a Walsh code tree 300 in accordance with the IS-95 and 1xEV-DV protocols. As discussed above, an IS-95 compliant system uses 64 Walsh codes of length 64 (i.e. $W_i{}^{64}$) to define channels for base stations to communicate with SUs in the forward link. According to the protocol, the first Walsh code $W_0{}^{64}$ is reserved for the Pilot channel (i.e., $W_U{}^n = W_0{}^{64}$), the second through eighth Walsh codes $W_1{}^{64}$-$W_7{}^{64}$ are reserved for Paging channels (i.e., $W_V{}^n = W_1{}^{64}$-$W_7{}^{64}$), and the $32^{nd}$ Walsh Code $W_{32}{}^{64}$ is reserved for the Sync channel (i.e., $W_Y{}^n = W_{32}{}^{64}$). A 1xEV-DV wireless communications system uses the 32-length Walsh codes $W_k{}^{32}$ which forms the basis for the 64-length Walsh codes $W_i{}^{64}$.

In general, the use of a 64-length Walsh code eliminates the 32-length Walsh code which it is derived from. Accordingly, the use of the first and second 64-length Walsh codes $W_0{}^{64}$ and $W_1{}^{64}$ for the Pilot channel and the first Paging channel eliminates the first 32-length Walsh code $W_0{}^{32}$ for use as a traffic channel in a 1xEV-DV compliant system. The use of the next six 64-length Walsh codes $W_2{}^{64}$-$W_7{}^{64}$ for the remaining Paging channels eliminates the second through fourth 32-length Walsh code $W_1{}^{32}$-$W_3{}^{32}$ for use as traffic channels in a 1xEV-DV compliant system. The use of the $32^{nd}$ 64-length Walsh code $W_{32}{}^{64}$ for the Sync channel eliminates the $16^{th}$ 32-length Walsh code $W_{16}{}^{32}$ for use as a traffic channel in a 1xEV-DV compliant system.

Accordingly, the way the Walsh code tree 300 is configured results in an inefficient use of channel resources and a relatively complicated algorithm implemented by a base station to assign a traffic channel to communicate with an SU. For instance, the nine 64-length Walsh codes used for the Pilot, Paging, and Sync channels eliminates 5 of the 32-length Walsh codes for use as traffic channels in a 1xEV-DV compliant system. In addition, because the Sync channel is assigned to the middle of the Walsh code tree 300, this creates discontinuous Walsh code sections for traffic channel use, which makes it more complicated for a base station to assign a traffic channel.

SUMMARY OF THE INVENTION

An aspect of the invention relates to a wireless communication system, comprising a network; and a plurality of base stations coupled to the network, wherein each of the base stations are adapted to transmit only a Pilot channel information, one or more Paging channel information, and a Sync channel information using a first group of adjacent Walsh codes $W_i{}^n$ to $W_{i+j}{}^n$, where i and j are integers, and n is the length of the Walsh codes. In the wireless communication system, the base station may be further adapted to transmit traffic channel information using a second group of adjacent Walsh codes $W_{i+j+1}{}^n$ to $W_{n-1}{}^n$, in the case where the Pilot, Paging, and Sync channels are situated at the upper end of the Walsh Codes (i.e., where i=0). Alternatively, the base station may be further adapted to transmit traffic channel information using a second group of adjacent Walsh codes $W_0{}^n$ to $W_{i-1}{}^n$ in the case where the Pilot, Paging, and Sync channels are situated at the lower end of the Walsh Codes (i.e., where i+j=n−1).

Alternatively, the base station may be further adapted to transmit traffic channel information using a second group of adjacent Walsh codes $W_{int(j/2+1)}^{n/2}$ to $W_{n/2-1}^{n/2}$ in the case where the Pilot, Paging, and Sync channels are situated at the upper end of the Walsh Codes (i.e., where i=0). Alternatively, the base station may be further adapted to transmit traffic channel information using a second group of adjacent Walsh codes $W_0^{n/2}$ to $W_{int(i/2-1)}^{n/2}$ in the case where the Pilot, Paging, and Sync channels are situated at the lower end of the Walsh Codes (i.e., where i+j=n−1).

Another aspect of the invention relates to a base station, comprising an RF interface, an antenna and a processor to transmit only a Pilot channel information, one or more Paging channel information, and a Sync channel information using a first group of adjacent Walsh codes $W_i^n$ to $W_{i+j}^n$, where i and j are integers, and n is the length of the Walsh codes. The base station may be further adapted to traffic channel information using a second group of adjacent Walsh codes $W_{i+j+1}^n$ to $W_{n-1}^n$ in the case where the Pilot, Paging, and Sync channels are situated at the upper end of the Walsh Codes (i.e., where i=0). Alternatively, the base station may be further adapted to transmit traffic channel information using a second group of adjacent Walsh codes $W_0^n$ to $W_{i-1}^n$ in the case where the Pilot, Paging, and Sync channels are situated at the lower end of the Walsh Codes (i.e., where i+j=n−1). Alternatively, the base station may be further adapted to transmit traffic channel information using a second group of adjacent Walsh codes $W_{int(j/2+1)}^{n/2}$ to $W_{n/2-1}^{n/2}$ in the case where Pilot, Paging, and Sync channels are situated at the upper end of the Walsh Codes (i.e., where i=0). Alternatively, the base station may be further adapted to transmit traffic channel information using a second group of adjacent Walsh codes $W_0^{n/2}$ to $W_{int(i/2-1)}^{n/2}$ in the case where Pilot, Paging, and Sync channels are situated at the lower end of the Walsh Codes (i.e., where i+j=n−1). A method and a computer readable medium including one or more software modules related to the operation of the base station are also disclosed.

Yet another aspect of the invention relates to a base station comprising an antenna; an up converter including an output coupled to the antenna; an I- and Q-modulator including an output coupled to the up converter; a summer including an output coupled to the I- and Q-modulator, a plurality of modulo-2 adders having respective inputs to receive Pilot, Paging, Sync, and traffic information, and other inputs to respectively coupled to a Walsh code source. The Walsh code source is adapted to provide the Pilot channel modulo-2 adder, one or more Paging channel modulo-2 adders, and the Sync channel modulo-2 adder using a first group of adjacent Walsh codes $W_i^n$ to $W_{i+j}^n$ generated by the Walsh code source, where i and j are integers, and n is the length of the Walsh codes. The Walsh code source may be adapted to provide the traffic channel modulo-2 adders with a second group of adjacent Walsh codes $W_{i+j+1}^n$ to $W_{n-1}^n$ generated by the Walsh code source in the case where the Pilot, Paging, and Sync channels are situated at the upper end of the Walsh Codes (i.e., where i=0). Alternatively, the Walsh code source may be further adapted to provide the traffic channel modulo-2 adders with a second group of adjacent Walsh codes $W_0^n$ to $W_{i-1}^n$ in the case where the Pilot, Paging, and Sync channels are situated at the lower end of the Walsh Codes (i.e., where i+j=n−1). The Walsh code source may be further adapted to provide the traffic channel modulo-2 adders with a second group of adjacent Walsh codes $W_{int(j/2+1)}^{n/2}$ to $W_{n/2-1}^{n/2}$ in the case where the Pilot, Paging, and Sync channels are situated at the upper end of the Walsh Codes (i.e., where i=0). The Walsh code source may be further adapted to provide traffic channel modulo-2 adders with a second group of adjacent Walsh codes $W_0^{n/2}$ to $W_{int(i/2-1)}^{n/2}$ in the case where the Pilot, Paging, and Sync channels are situated at the lower end of the Walsh Codes (i.e., where i+j=n−1).

Still another aspect of the invention relates to a subscriber unit, comprising an RF interface; an antenna; and a processor to receive only a Pilot channel information, one or more Paging channel information, and a Sync channel information by way of the antenna and the RF interface using a first group of adjacent Walsh codes $W_i^n$ to $W_{i+j}^n$, where i and j are integers, and n is the length of the Walsh codes. The processor may be further adapted to receive traffic channel information by way of the antenna and the RF interface using any in a second group of adjacent Walsh codes $W_{i+j+1}^n$ to $W_{n-1}^n$ in the case where the Pilot, Paging, and Sync channels are situated at the upper end of the Walsh Codes (i.e., where i=0). Alternatively, the processor is further adapted to receive traffic channel information by way of the antenna and the RF interface using a second group of adjacent Walsh codes $W_0^n$ to $W_{i-1}^n$ in the case where the Pilot, Paging, and Sync channels are situated at the lower end of the Walsh Codes (i.e., where i+j=n−1). Alternatively, the processor may be further adapted to receive traffic channel information by way of the antenna and the RF interface using any in a second group of adjacent Walsh codes $W_{int(j/2+1)}^{n/2}$ to $W_{n/2-1}^{n/2}$ in the case the where Pilot, Paging, and Sync channels are situated at the upper end of the Walsh Codes (i.e., where i=0). Alternatively, the processor may be further adapted to receive traffic channel information by way of the antenna and the RF interface using any in a second group of adjacent Walsh codes $W_0^{n/2}$ to $W_{int(i/2-1)}^{n/2}$ in the case the where Pilot, Paging, and Sync channels are situated at the lower end of the Walsh Codes (i.e., where i+j=n−1). A method and a computer readable medium including one or more software modules related to the operation of the subscriber unit station are also disclosed.

Other aspects, features, and techniques of the invention will be apparent to one skilled in the relevant art in view of the following detailed description of the invention.

DETAILED DESCRIPTION OF THE PREFERRED EMBODIMENTS

Figure 4:
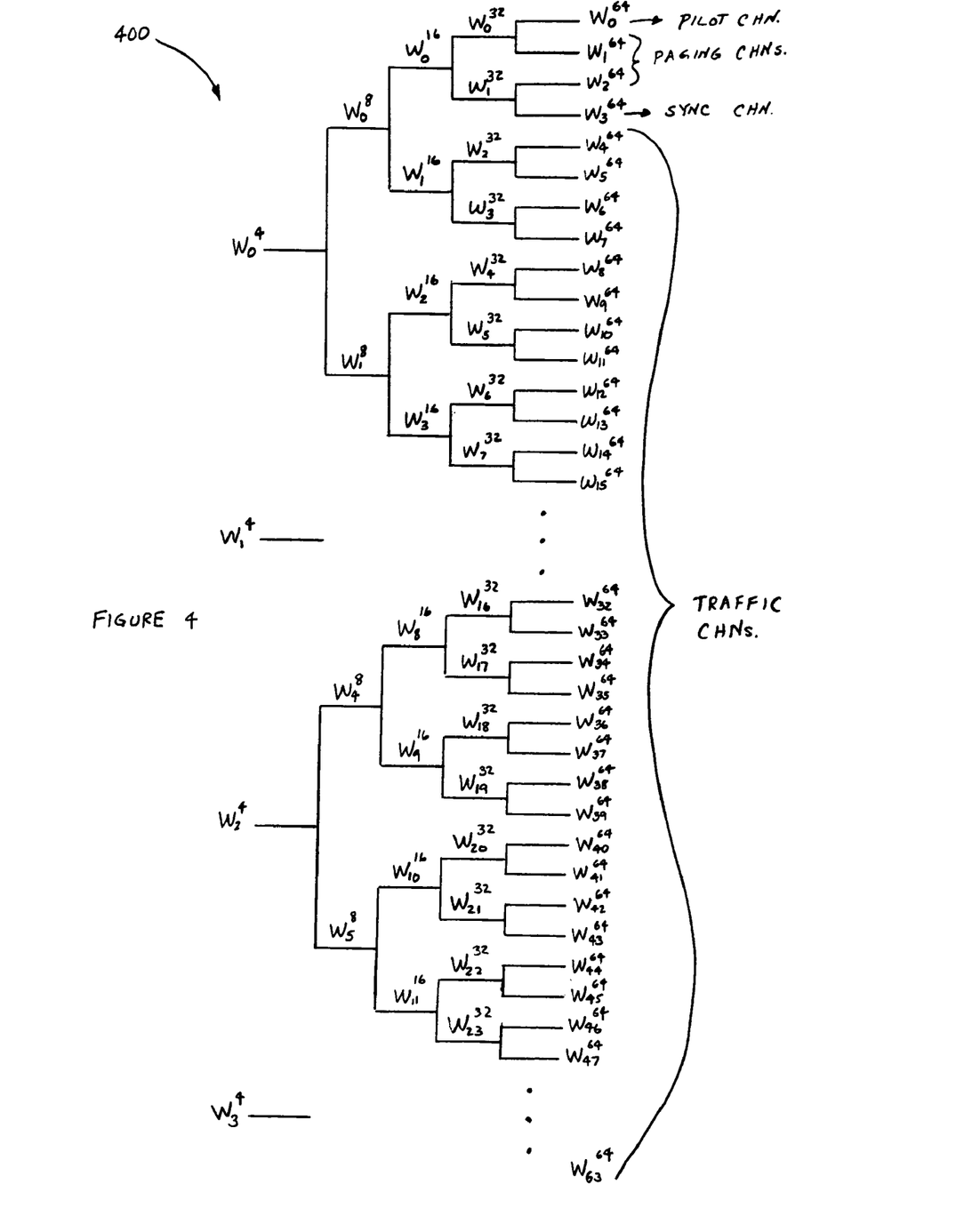
FIG. 4 illustrates a diagram of an exemplary Walsh code tree in accordance with an aspect of the invention.

FIG. 4 illustrates a diagram of an exemplary Walsh code tree 400 in accordance with an aspect of the invention. The new Walsh code tree 400 can be used in wireless communication system 100 and by base stations 104, 106, and 200, as discussed above. In addition, the new Walsh code tree 400 can be used in a base station and subscriber unit as are described with reference to FIGS. 5A and 6A discussed below.

According to the new Walsh code tree 400, the Pilot channel is assigned to the first Walsh code $W_0^{64}$, the Paging channels are assigned to the second and third Walsh codes $W_1^{64}$-$W_2^{64}$, the Sync channel is assigned to the fourth Walsh Code $W_3^{64}$, and the traffic channels are assigned to the remaining Walsh codes $W_4^{64}$-$W_{63}^{64}$. With this new Walsh code tree 400, only two 32-length Walsh codes are used for the Pilot, Paging, and Sync Channels. Accordingly, there are 30 32-length Walsh codes available for traffic channel. In addition, according to the new Walsh code tree 400, the Pilot, Paging, and Sync channels use adjacent Walsh codes $W_0^{64}$-$W_3^{64}$ situated at the top end of the Walsh code tree. This arrangement allows the traffic channels to be assigned to a continuous block of adjacent Walsh codes $W_4^{64}$-$W_{63}^{64}$ for IS-95, and $W_2^{32}$-$W_{31}^{32}$ for 1xEV-DV. Although only two Paging channels are used to exemplify the invention, it shall be understood that the new Walsh code assignment 400 may include one or more Paging channels.

The new Walsh code tree 400 utilizes channel resources more efficiently than that of Walsh code tree 300. For instance, the new Walsh code assignment 400 has 30 codes reserved for traffic channels, whereas the old Walsh code assignment 300 only has 27 codes reserved for traffic channels. Furthermore, the process of selecting a traffic channel using the new Walsh code assignment 400 is much simpler because it has a continuous block of Walsh codes for traffic channels, whereas it is much more difficult for the old Walsh code assignment since it has discontinuous blocks of Walsh codes for traffic channels.

In general, according to the new Walsh code assignment 400, the Pilot, Paging, and Sync channels (i.e. non-traffic channels) are assigned to adjacent Walsh codes $W_i^n$-$W_{i+j}^n$ (where i and j are integers, and n is the length of the Walsh codes). In addition, the Pilot, Paging, and Sync channels (i.e. non-traffic channels) may be assigned to either ends of the Walsh codes $W_i^n$-$W_{i+j}^n$ (where i=0 or i+j=n−1). If the Pilot, Paging, and Sync channels are assigned to either end of the Walsh codes, the traffic channels may be assigned to the remaining Walsh codes $W_{i+j+1}^n$ to $W_{n-1}^n$ or $W_0^n$ to $W_{i-1}^n$. Alternatively, the traffic channels may be assigned to $W_{int(j/2+1)}^{n/2}$ to $W_{n/2-1}^{n/2}$ or $W_0^{n/2}$ to $W_{int(i/2-1)}^{n/2}$.

Figure 5A:
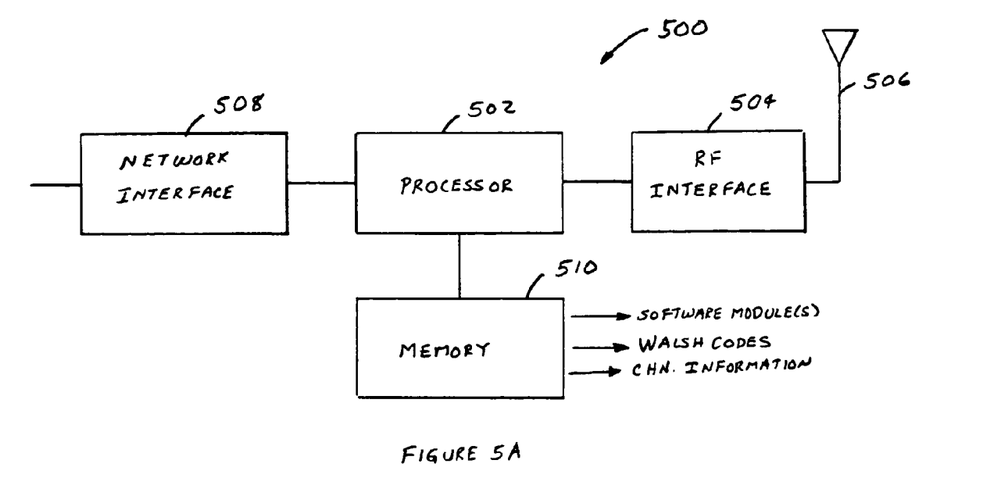
FIG. 5A illustrates a block diagram of an exemplary base station in accordance with another aspect of the invention.

FIG. 5A illustrates a block diagram of an exemplary base station 500 in accordance with another aspect of the invention. The base station 500 is an exemplary detailed version of base stations 104 and 106 of the wireless communication system 100. The base station 500 comprises a processor 502, a radio frequency (RF) interface 504, an antenna 506, a network interface 508, and a memory 510.

The processor 502 performs the various operations of the base station 500 as described with reference to FIG. 5B. The RF interface 504 and antenna 506 provide the base station 500 with an interface to the wireless medium for transmitting communications to and receiving communications from SUs. The network interface 508 provides the base station 500 with an interface to the network 102 for transmitting communications to and receiving communications from various network devices. The memory 510, serving generally as a computer readable medium, stores one or more software module(s) that control the operations of the processor 502, the set of Walsh codes assigned to the various channels according to the new assignment described herein, and information transmitted via the Pilot, Paging, and Sync channels.

Figure 5B:
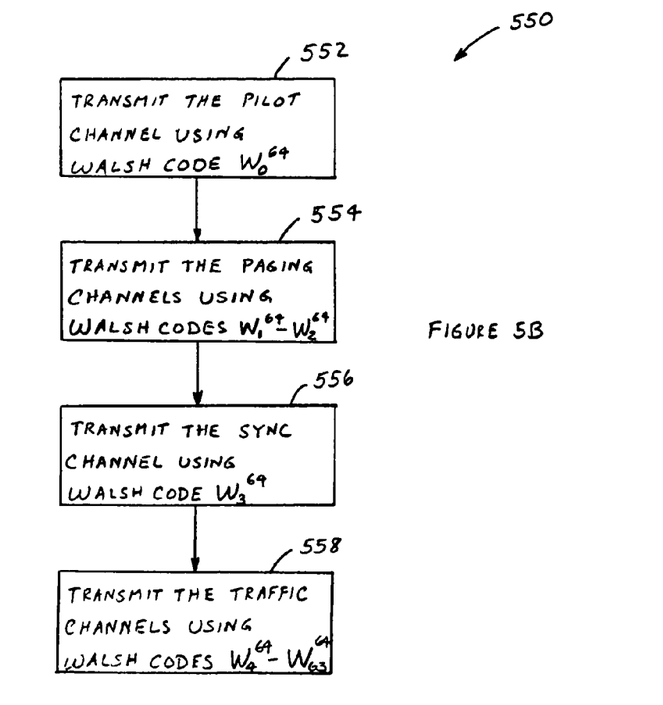
FIG. 5B illustrates a flow diagram of an exemplary method implemented by a base station in accordance with another aspect of the invention.

FIG. 5B illustrates a flow diagram of an exemplary method 550 implemented by the base station 500 in accordance with another embodiment of the invention. According to the method 550, the processor 502 transmits the Pilot information via the RF interface 504 and antenna 506 per the new Walsh code assignments (e.g., $W_0^{64}$) (block 552). The processor 502 also transmits the Paging information via the RF interface 504 and antenna 506 per the new Walsh code assignments (e.g., $W_1^{64}$-$W_2^{64}$) (block 554). The processor 502 also transmits the Sync information via the RF interface 504 and antenna 506 per the new Walsh code assignments (e.g., $W_3^{64}$) (block 556). And, the processor 502 transmits the traffic channel information received by way of the network interface 508 to the SUs via the RF interface 504 and antenna 506 per the new Walsh code assignments (e.g., $W_4^{64}$-$W_{63}^{64}$ or $W_2^{32}$-$W_{31}^{32}$) (block 558).

Figure 6A:
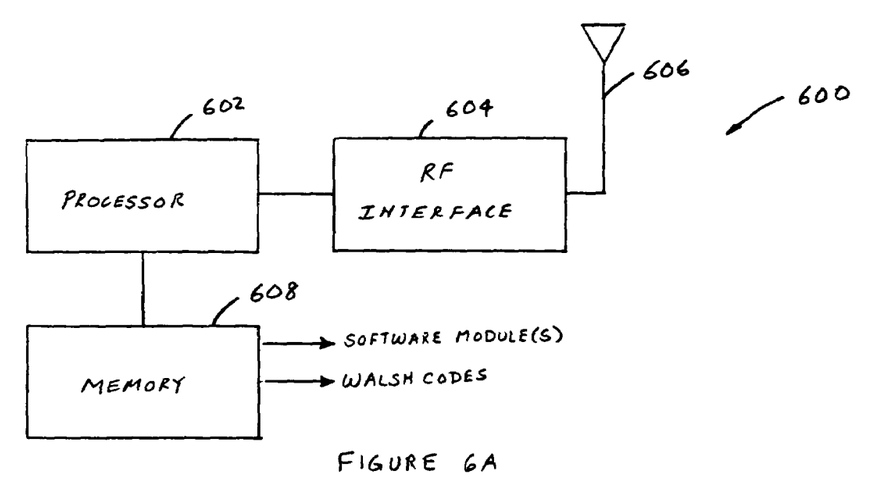
FIG. 6A illustrates a block diagram of an exemplary subscriber unit in accordance with another aspect of the invention.

FIG. 6A illustrates a block diagram of an exemplary subscriber unit 600 in accordance with another aspect of the invention. The subscriber unit 600 is an exemplary detailed version of subscriber units 108, 110, 112 of the wireless communication system 100. The subscriber unit 600 comprises a processor 602, an RF interface 604, an antenna 606, and a memory 608.

The processor 602 performs the various operations of the subscriber unit 600 as described with reference to FIG. 6B. The RF interface 604 and antenna 606 provide the subscriber unit 600 with an interface to the wireless medium for transmitting communications to and receiving communications from base stations. The memory 608, serving generally as a computer readable medium, stores one or more software module(s) that control the operations of the processor 602, and a set of Walsh codes assigned to the various channels according to the new assignment described herein.

Figure 6B:
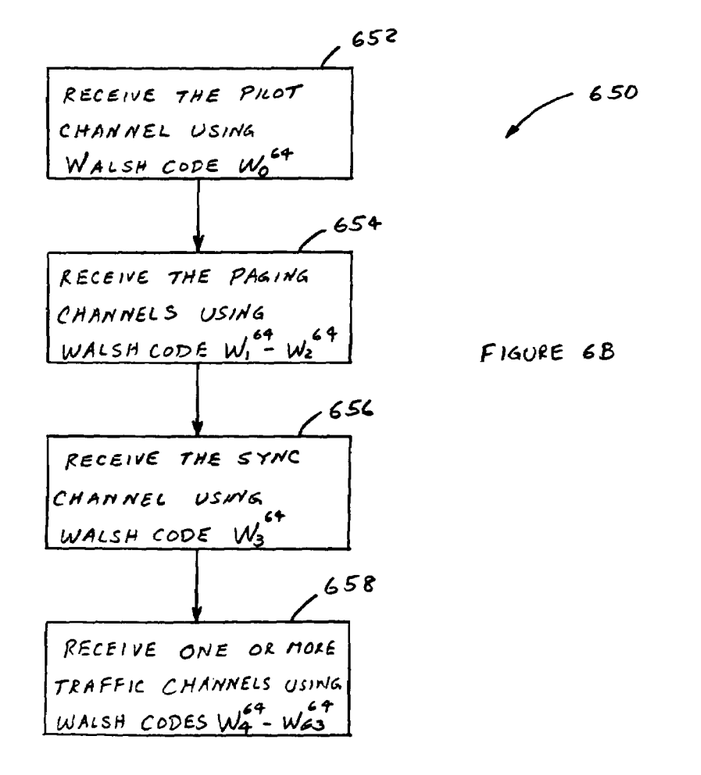
FIG. 6B illustrates a flow diagram of an exemplary method implemented by a subscriber unit station in accordance with another aspect of the invention.

FIG. 6B illustrates a flow diagram of an exemplary method 650 implemented by the subscriber unit 600 in accordance with another embodiment of the invention. According to the method 650, the processor 602 receives the Pilot information via the RF interface 604 and antenna 606 per the new Walsh code assignments (e.g., $W_0^{64}$) (block 652). The processor 602 also receives the Paging information via the RF interface 604 and antenna 606 per the new Walsh code assignments (e.g., $W_1^{64}$-$W_2^{64}$) (block 654). The processor 602 also receives the Sync information via the RF interface 604 and antenna 606 per the new Walsh code assignments (e.g., $W_3^{64}$) (block 656). And, the processor 602 receives the traffic channel information received via the RF interface 604 and antenna 606 per the new Walsh code assignments (e.g., $W_4^{64}$-$W_{63}^{64}$ or $W_2^{32}$-$W_{31}^{32}$) (block 658).

Although the exemplary embodiments have been described with reference to a fixed length Walsh code system, it shall be understood that may be applicable to systems using variable-length Walsh codes, e.g. a system in compliance with CDMA 2000.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

It is claimed:

1. A wireless communication system, comprising:
   a network; and
   a plurality of base stations coupled to said network, wherein each of said base stations transmits only a Pilot channel information, one or more Paging channel information, and a Sync channel information using a first group of adjacent Walsh codes $W_i^n$ to $W_{i+j}^n$, and each of said base stations transmits only traffic information using a second group of adjacent Walsh codes, where i and j are integers, n is the length of each of the Walsh codes and a sum of a number of Walsh codes in the first and second groups of adjacent Walsh codes is equal to n.

2. The wireless communication system of claim 1, wherein said second group of adjacent Walsh codes is $W_{i+j+1}^n$ to $W_{n-1}^n$.

3. The wireless communication system of claim 1, wherein said second group of adjacent Walsh codes is $W_0^n$ to $W_{i-1}^n$.

4. The wireless communication system of claim 1, wherein i is equal to zero.

5. The wireless communication system of claim 4, wherein the Pilot channel information is transmitted using Walsh code $W_0^n$.

6. The wireless communication system of claim 1, wherein the Sync channel information is transmitted using Walsh code $W_{i+j}^n$.

7. The wireless communication system of claim 1, wherein the one or more Paging channels are transmitted using one or more Walsh codes $W_{i+1}^n$ to $W_{i+j-1}^n$.

8. A base station, comprising:
an RF interface;
an antenna; and
a processor to transmit only a Pilot channel information, one or more Paging channel information, and a Sync channel information using a first group of adjacent Walsh codes $W_i^n$ to $W_{i+j}^n$, and to transmit only traffic information using a second group of adjacent Walsh codes, where i and j are integers, n is the length of the Walsh codes and a sum of a number of Walsh codes in the first and second groups of adjacent Walsh codes is equal to n.

9. The base station of claim 8, wherein said second group of adjacent Walsh codes is $W_{i+j+1}^n$ to $W_{n-1}^n$.

10. The base station of claim 8, wherein said second group of adjacent Walsh codes is $W_0^n$ to $W_{i-1}^n$.

11. A method comprising:
transmitting only a Pilot channel information, one or more Paging channel information, and a Sync channel information using a first group of adjacent Walsh codes $W_i^n$ to $W_{i+j}^n$; and
transmitting only traffic information using a second group of adjacent Walsh codes,
where i and j are integers, n is the length of the Walsh codes and a sum of a number of Walsh codes in the first and second groups of adjacent Walsh codes is equal to n.

12. The method of claim 11, wherein said second group of adjacent Walsh codes is $W_{i+j+1}^n$ to $W_{n-1}^n$.

13. The method of claim 11, wherein said second group of adjacent Walsh codes is $W_0^n$ to $W_{i-1}^n$.

14. A method comprising:
transmitting only a Pilot channel information, one or more Paging channel information, and a Sync channel information using a first group of adjacent Walsh codes $W_i^n$ to $W_{i+j}^n$; and
transmitting only traffic information using a second group of adjacent Walsh codes,
where i and j are integers, n is the length of the Walsh codes, wherein said second group of adjacent Walsh codes is one of $W_{int(j/2+1)}^{n/2}$ to $W_{n/2-1}^{n/2}$ or $W_0^{n/2}$ to $W_{int(i/2-1)}^{n/2}$.

15. A computer readable medium including one or more software modules to control a processor to:

transmit only a Pilot channel information, one or more Paging channel information, and a Sync channel information using a first group of adjacent Walsh codes $W_i^n$ to $W_{i+j}^n W_{i+j}^n$; and
transmit only traffic information using a second group of adjacent Walsh codes,
where i and j are integers, n is the length of the Walsh codes and a sum of a number of Walsh codes in the first and second groups of adjacent Walsh codes is equal to n.

16. The computer readable medium of claim 15, wherein said second group of adjacent Walsh codes is $W_{i+j+1}^n$ to $W_{n-1}^n$.

17. The computer readable medium of claim 15, wherein said second group of adjacent Walsh codes is $W_0^n$ to $W_{i-1}^n$.

18. A base station, comprising:
an antenna;
an up converter including an output coupled to said antenna;
an I- and Q- modulator including an output coupled to said up converter;
a summer including an output coupled to said I- and Q- modulator;
a plurality of modulo-2 adders including respective inputs to receive Pilot channel information, one or more Paging channel information, and a Sync channel information, and other inputs to only receive Walsh codes in a manner that said Pilot channel information, one or more Paging channel information, and a Sync channel information are modulo-2 added respectively with a first group of adjacent Walsh codes $W_i^n$ to $W_{i+j}^n$; and
other modulo-2 adders that modulo-2 add only traffic channel information with a second group of adjacent Walsh codes,
where i and j are integers, n is the length of the Walsh codes and a sum of a number of Walsh codes in the first and second groups of adjacent Walsh codes is equal to n.

19. The base station of claim 18, wherein said second group of adjacent Walsh codes is $W_{i+j+1}^n$ to $W_{n-1}^n$.

20. The base station of claim 18, wherein said second group of adjacent Walsh codes is $W_0^n$ to $W_{i-1}^n$.

21. A subscriber unit, comprising:
an RF interface;
an antenna; and
a processor to receive only a Pilot channel information, one or more Paging channel information, and a Sync channel information by way of said antenna and said RF interface using a first group of adjacent Walsh codes $W_i^n$ to $W_{i+j}^n$ and to receive only traffic channel information using a second group of adjacent Walsh codes, where i and j are integers, n is the length of the Walsh codes and a sum of a number of Walsh codes in the first and second groups of adjacent Walsh codes is equal to n.

22. The subscriber unit of claim 21, wherein said second group of adjacent Walsh codes is $W_{i+j+1}^n$ to $W_{n-1}^n$.

23. The subscriber unit of claim 21, wherein said second group of adjacent Walsh codes is $W_0^n$ to $W_{i-1}^n$.

24. A method comprising:
receiving only a Pilot channel information, one or more Paging channel information, and a Sync channel information using a first group of adjacent Walsh codes $W_i^n$ to $W_{i+j}^n$; and
receiving only traffic channel information using a second group of adjacent Walsh codes, where i and j are integers, n is the length of the Walsh codes and a sum of a number of Walsh codes in the first and second groups of adjacent Walsh codes is equal to n.

25. The method of claim 24, wherein said second group of adjacent Walsh codes is $W_{i+j+1}{}^n$ to $W_{n-1}{}^n$.

26. The method of claim 24, wherein said second group of adjacent Walsh codes is $W_0{}^n$ to $W_{i-1}{}^n$.

27. A computer readable medium including one or more software modules to control a processor to:

receive only a Pilot channel information, one or more Paging channel information, and a Sync channel information using a first group of adjacent Walsh codes $W_i{}^n$ to $W_{i+j}{}^n$; and receive only traffic channel information using a second group of adjacent Walsh codes, where i and j are integers, n is the length of the Walsh codes, and a sum of a number of Walsh codes in the first and second groups of adjacent Walsh codes is equal to n.

28. The computer readable medium of claim 27, wherein said second group of adjacent Walsh codes is $W_{i+j+1}{}^n$ to $W_{n-1}{}^n$.

29. The computer readable medium of claim 27, wherein said second group of adjacent Walsh codes is $W_0{}^n$ to $W_{i-1}{}^n$.

* * * * *